(12) United States Patent
Song et al.

(10) Patent No.: US 8,574,783 B2
(45) Date of Patent: Nov. 5, 2013

(54) FUEL CELL STACK INCLUDING BUFFER PROTRUSION SYSTEM IN CONNECTION CHANNEL

(75) Inventors: Kah-Young Song, Yongin-si (KR); Jin-Hwa Lee, Yongin-si (KR); Sang-Il Han, Yongin-si (KR); Hee-Tak Kim, Yongin-si (KR); Tae-Yoon Kim, Yongin-si (KR); Sung-Yong Cho, Yongin-si (KR); Myoung-Ki Min, Yongin-si (KR); Geun-Seok Chai, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 315 days.

(21) Appl. No.: 12/951,826

(22) Filed: Nov. 22, 2010

(65) Prior Publication Data
US 2011/0305969 A1    Dec. 15, 2011

(30) Foreign Application Priority Data
Jun. 11, 2010   (KR) ................. 10-2010-0055629

(51) Int. Cl.
*H01M 2/40* (2006.01)
(52) U.S. Cl.
USPC ........... 429/458; 429/452; 429/454; 429/456; 429/457; 429/467; 429/468
(58) Field of Classification Search
USPC ......... 429/467, 452, 454, 456, 457, 458, 468
See application file for complete search history.

(56) References Cited

U.S. PATENT DOCUMENTS 6,500,580 B1    12/2002  Marvin et al.
7,226,688 B2 *   6/2007  Fujii et al. ............... 429/434

FOREIGN PATENT DOCUMENTS

| JP | 2001-121560 A | 5/2001 |
| KR | 10-2006-0086983 A | 1/2006 |
| KR | 10-0726893 B1 | 4/2007 |
| KR | 10-2009-0072536 A | 2/2009 |

OTHER PUBLICATIONS

KIPO Office Action (Korean only) dated Oct. 20, 2011 in related Korean Application No. KP-10-2010-0055629, which is the priority application to the present application.

* cited by examiner

*Primary Examiner* — Sean P Cullen
(74) *Attorney, Agent, or Firm* — Knobbe, Martens, Olson & Bear LLP

(57) ABSTRACT

A fuel cell stack including membrane-electrode assemblies and separators formed between each of the membrane-electrode assemblies is disclosed. The membrane-electrode assemblies may each include an electrolyte membrane, an anode formed on a first surface of the electrolyte membrane, and a cathode formed on a second surface of the electrolyte membrane. Each of the separators may include an anode separator facing the anode and a cathode separator facing the cathode. Each of the separators may include at least two manifolds, a channel separated from the manifolds and facing either the anode or the cathode, and a connection channel fluidly connecting the manifold and the channel. The separator may also include a buffer protrusion system in the connection channel configured to disperse the flow of the fuel or the oxidant.

9 Claims, 7 Drawing Sheets

FUEL CELL STACK INCLUDING BUFFER PROTRUSION SYSTEM IN CONNECTION CHANNEL

CROSS-REFERENCE TO RELATED APPLICATIONS

This application claims priority to and the benefit of Korean Patent Application No. 10-2010-0055629 filed in the Korean Intellectual Property Office on Jun. 11, 2010, the entire contents of which are incorporated herein by reference.

BACKGROUND

1. Field of the Disclosure

The described technology relates to a fuel cell stack. More particularly, it relates to a structure of a separator of a fuel cell stack.

2. Description of the Related Technology

A fuel cell system includes a fuel cell stack that generates electrical energy using electrochemical reaction of a fuel (hydrocarbon-based fuel, pure hydrogen, or reformed gas rich in hydrogen) and an oxidizing agent (air or pure oxygen). The fuel cell stack includes a plurality of membrane-electrode assemblies (MEAs) and a plurality of separators formed between the MEAs.

A MEA includes an electrolyte membrane, an anode formed at one side of the electrolyte membrane, and a cathode formed at the other side of the electrolyte membrane. The separator on the anode side of the MEA is formed with a fuel channel on the surface facing the anode. The separator on the cathode side of the MEA is formed with an oxidant channel on the surface facing the cathode. Two fuel manifolds and two oxidant manifolds are formed on an edge of each separator. The fuel channel is in fluid communication with two fuel manifolds, and the oxidant channel is in fluid communication with two oxidant manifolds.

In operation, fuel supplied through a first fuel manifold passes through the fuel channel and is provided to the anode. Unreacted fuel is exhausted through a second fuel manifold. Similarly, oxidant supplied through a first oxidant manifold passes through the oxidant channel and is provided to the cathode. Moisture and unreacted air is exhausted through a second oxidant manifold of the opposite side. The oxidant channel and the fuel channel are formed of a concave groove having a small width and a long length, thereby having a smaller cross-section than the oxidant manifold and the fuel manifold. Accordingly, the pressure of the fluid quickly increases both when the oxidant enters the oxidant channel from the oxidant manifold and the fuel enters the fuel channel from the fuel manifold. As a result, high pressure of the fluid is concentrated in the region where the fuel initially enters among the anode and the oxidant initially enters among the cathode. This high pressure makes it is difficult to uniformly distribute the fuel and the oxidant at the entrances of the fuel channel and the oxidant channel, respectively.

Further, because the oxidant supplied to the fuel cell stack is in a non-humidified state, the region where the oxidant is initially supplied to the cathode operates in a very dry state. This dry state may increase radicals generated during operation of the membrane-electrode assembly, which consequently may hasten deterioration of the membrane-electrode assembly.

SUMMARY OF CERTAIN INVENTIVE EMBODIMENTS

In one aspect, a fuel cell stack is provided with a separator capable of suppressing deterioration of the membrane-electrode assembly due to fluid-flow stress concentration.

In another aspect, a fuel cell stack is provided for uniformly distributing fuel and oxidant in a fuel channel and an oxidant channel, respectively, by decreasing pressure generated in the entrance of the fuel channel and the oxidant channel.

In another aspect, a fuel cell stack includes a plurality of membrane-electrode assemblies and a plurality of separators positioned between the membrane-electrode assemblies.

In some embodiments, each of the plurality of membrane-electrode assemblies includes, for example, an electrolyte membrane, an anode formed on a first surface of the electrolyte membrane, and a cathode formed on a second surface of the electrolyte membrane. In some embodiments, each of the plurality of separators includes, for example, an anode separator facing the anode and a cathode separator facing the cathode, at least two manifolds, a channel separated from the manifolds and facing at least one of the anode and the cathode, a connection channel in fluid communication with the manifold and the channel, and a buffer protrusion system formed within the connection channel and configured to disperse the flow of the fuel or the oxidant.

In some embodiments, the cathode separator includes, for example, an oxidant manifold, an oxidant channel separated from the oxidant manifold and facing the cathode, and a first connection channel in fluid communication with the oxidant manifold and the oxidant channel. In some embodiments, a first buffer protrusion system is formed in the first connection channel and configured to disperse oxidant flow. In some embodiments, the two oxidant manifolds and the two first connection channels are formed in the cathode separator. In some embodiments, the first buffer protrusion system is formed in the first connection channel in an area configured to receive oxidant. In some embodiments, the first connection channel includes, for example, a first flow path formed on the inner surface of the cathode separator from the oxidant manifold toward the oxidant channel and a second flow path in fluid communication with both an end portion of the first flow path and the oxidant channel in a thickness direction of the cathode separator. In some embodiments, the first buffer protrusion system includes, for example, a plurality of buffer protrusions alternately formed on opposite sides of the first flow path and the second flow path. In some embodiments, the cathode separator and the anode separator are in positioned in proximity to each other such that the inner surface of the anode separator covers the first connection channel. In some embodiments, the first buffer, protrusion system is formed on the anode separator. In some embodiments, the first buffer protrusion system includes, for example, a plurality of first buffer protrusions alternately formed on an inner surface of the cathode separator and an inner surface of the anode separator along the length direction of the first flow path.

In some embodiments, the anode separator includes, for example, a fuel manifold, a fuel channel separated from the fuel manifold and facing the anode, and a second connection channel in fluid communication with the fuel manifold and the fuel channel are formed in the anode separator. In some embodiments, a second buffer protrusion system is formed in the second connection channel and configured to disperse fuel flow. In some embodiments, the two fuel manifolds and the two second connection channels are formed in the anode separator. In some embodiments, the second buffer protrusion system is formed in an area of the second connection channel configured to receive fuel. In some embodiments, the second connection channel includes, for example, a third flow path formed on the inner surface of the anode separator from the fuel manifold toward the fuel channel and a fourth flow path formed in fluid communication between an end portion of the third flow path and the fuel channel in a thickness direction of the anode separator. In some embodiments, the second buffer protrusion system includes, for example, a plurality of second buffer protrusions alternately positioned on opposite sides of the third flow path and the fourth flow path. In some embodiments, the cathode separator and the anode separator are positioned in proximity to each other such that the inner surface of the cathode separator covers the second connection channel. In some embodiments, the cathode separator includes, for example, the second buffer protrusion system within the second connection channel. In some embodiments, the second buffer protrusion system includes, for example, a plurality of second buffer protrusions alternately formed in the inner surfaces of the cathode separator and the anode separator along the length direction of the third flow path.

In some embodiments, uniform distribution of oxidant or fuel improves contact efficiency of the cathode and the anode, respectively, such that electricity generating efficiency of the membrane-electrode assembly is improved.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
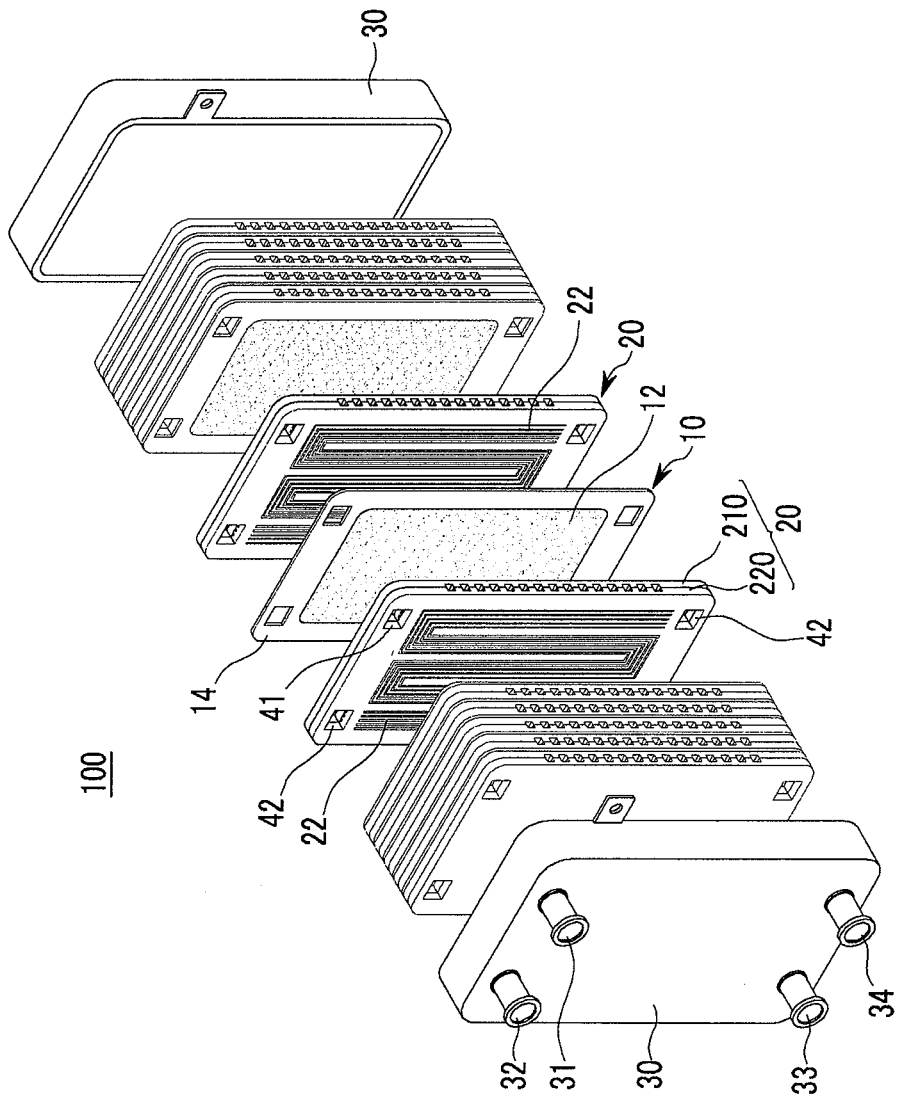
FIG. 1 is an exploded perspective view of a fuel cell stack according to a first exemplary embodiment.

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. Certain embodiments will be described in more detail with reference to the accompanying drawings, so that a person having ordinary skill in the art can readily make and use aspects of the present disclosure.

Figure 2:
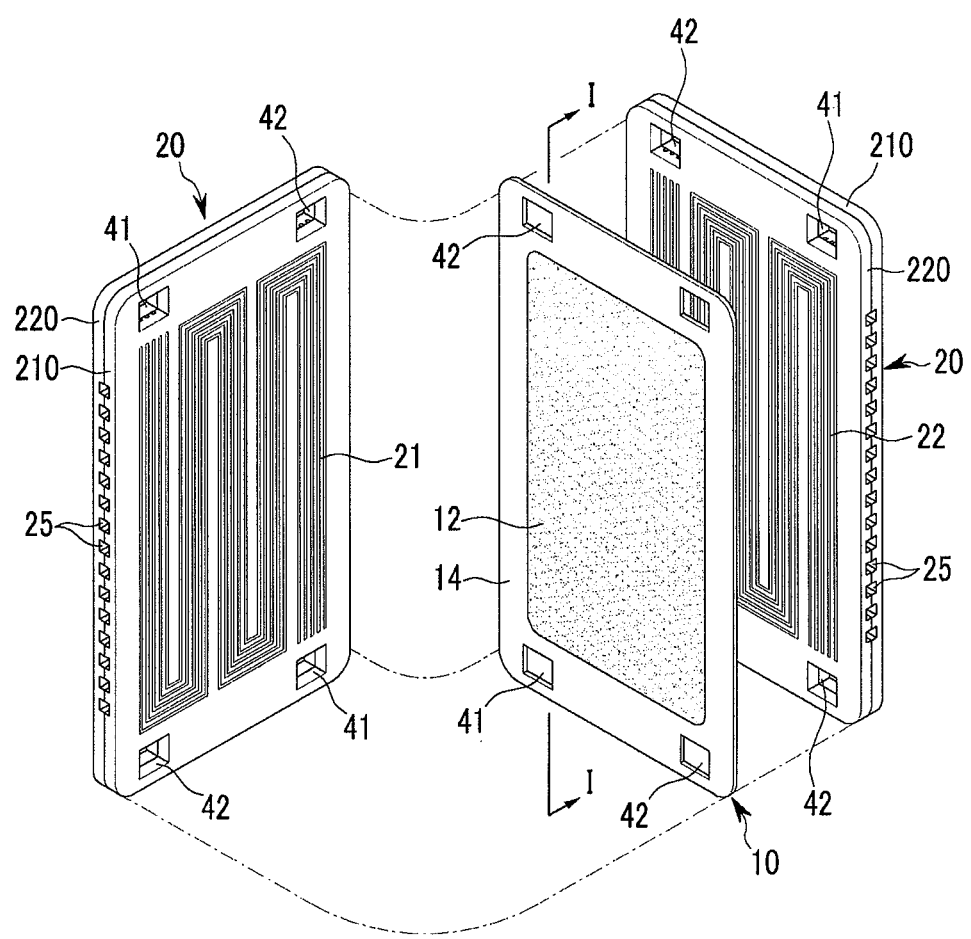
FIG. 2 is an exploded perspective view of one membrane-electrode assembly and two separators in the fuel cell stack of in FIG. 1.

FIG. 1 is an exploded perspective view of a fuel cell stack according to a first exemplary embodiment, and FIG. 2 is an exploded perspective view of one membrane-electrode assembly and two separators in the fuel cell stack of FIG. 1. Referring to FIGS. 1 and 2, a fuel cell stack 100 may include a plurality of membrane-electrode assemblies 10 and a plurality of separators 20 positioned adjacent to and between the membrane-electrode assemblies 10. One membrane-electrode assembly 10 and two separators 20 are positioned at respective sides thereof form one unit cell configured to generate electrical energy.

In operation, the membrane-electrode assembly 10 is supplied with a fuel and an oxidant through the separator 20. The membrane-electrode assembly 10 is configured to generate electrical energy by using an electrochemical reaction of the fuel and the oxidant. The separator 20 is configured to pressurize the membrane-electrode assembly 10 with weak mechanical strength to support the membrane-electrode assembly 10. The separator 20 is also configured to electrically connect the membrane-electrode assemblies 10. The fuel cell stack 100 may be supplied with a hydrocarbonaceous fuel (methanol, ethanol, liquefied petroleum gas, liquefied natural gas, gasoline, butane gas, etc.) in a liquid phase or a gas phase. In some embodiments, the fuel cell stack 100 is supplied with hydrogen, which is reformed by a reformer from the hydrocarbonaceous fuel or hydrogen-enriched reformate gas, as a fuel. The fuel cell stack 100 may also be supplied with pure oxygen stored in a separate storage unit, or supplied with external air containing oxygen, as an oxidant.

The outermost part of the fuel cell stack 100 includes a pair of end plates 30 configured to integrally fix the membrane-electrode assemblies 10 and the separators 20. Any one of the end plates 30 may be formed with a fuel injection hole 31 configured to supply fuel, an oxidant injection hole 32 configured to supply oxidant, a fuel outlet 33 configured to discharge unreacted fuel, and an oxidant outlet 34 configured to discharge moisture and unreacted air.

In some embodiments, the positions of the fuel injection hole 31 and the fuel outlet 33 may be exchanged. In some embodiments, the positions of the oxidant injection hole 32 and the oxidant outlet 34 may be exchanged. In some embodiments, the positions of the fuel injection hole 31 and the oxidant injection hole 32 may be exchanged. In some embodiments, the positions of the fuel outlet 33 and the oxidant outlet 34 may be exchanged. Although FIG. 1 illustrates the exemplary embodiment where one of the end plates 30 is provided with two injection holes 31 and 32 and two outlets 33 and 34, a configuration in which either one of the end plates 30 may be provided with the fuel injection hole 31 and the oxidant injection hole 32 and the other of the end plates 30 may be formed with the fuel outlet 33 and the oxidant outlet 34 may be allowed.

Figure 3:
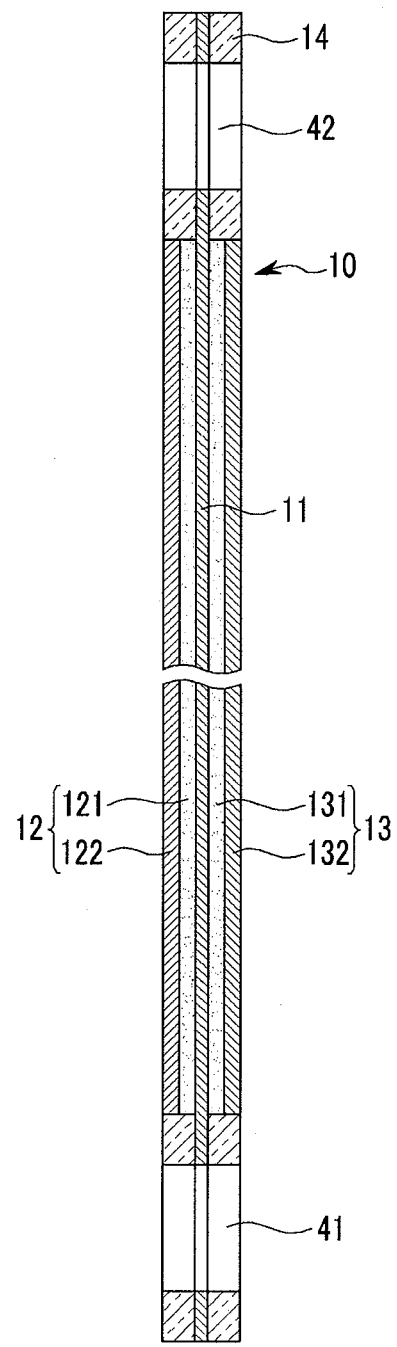
FIG. 3 is a cross-sectional view of the membrane-electrode assembly taken along the line I-I of FIG. 2.

FIG. 3 is a cross-sectional view of a membrane-electrode assembly taken along the line I-I of FIG. 2. Referring to FIGS.

2 and 3, the membrane-electrode assembly 10 includes an electrolyte membrane 11, an anode 12 formed at one surface of the electrolyte membrane 11, a cathode 13 formed at an opposing side to the electrolyte membrane 11, and a supporting film 14 fixed to an edge of the electrolyte membrane 11.

In operation, the anode 12 is supplied with fuel. The anode 12 includes a catalyst 121 configured to convert hydrogen in fuel into electrons and hydrogen ions by an oxidation reaction. The anode 12 also includes a gas diffusion layer 122 formed to cover the catalyst layer 121. In operation, the cathode 13 is supplied with an oxidant. The cathode includes a catalyst 131 configured to convert oxygen in the oxidant into oxygen ions by a reduction reaction. The cathode also includes a gas diffusion layer 132 formed to cover the catalyst layer 131. The electrolyte membrane 11 has an ion exchange function configured to move protons generated in the anode 12 to the cathode 13.

The anode 12 and the cathode 13 are formed with a smaller size than the electrolyte membrane 11. The supporting film 14 may be attached to the edge of the electrolyte membrane 11. The supporting film 14 is configured to suppress the expansion and crease generation of the electrolyte membrane 11 due to moisture adsorption. The supporting film 14 is also mechanically connected to the separator 20.

The separator 20 may be divided into an anode separator 210 that faces the anode 12 and a cathode separator 220 that faces the cathode 13. A fuel channel 21 is formed on one surface of the anode separator 210 facing toward the anode 12. An oxidant channel 22 is formed on one surface of the cathode separator 220 facing toward the cathode 13. The anode separator 210 and the cathode separator 220 may be integrally bonded to each other. In the configuration where the anode separator 210 and the cathode separator 220 are integrally bonded together, they may be called a bipolar plate.

The anode separator 210, the cathode separator 220, and the supporting film 14 of the membrane-electrode assembly 10 commonly form two fuel manifolds 41 configured to allow the fuel pass through and two oxidant manifolds 42 configured to allow the oxidant pass through, respectively. The two fuel manifolds 41 are formed opposite to each other in a first diagonal direction. The two oxidant manifolds 42 are formed opposite to each other in a second diagonal direction. The fuel channel 21 is formed in fluid communication with the two fuel manifolds 41. The oxidant channel 22 is formed in fluid communication with the two oxidant manifolds 42.

In operation, the fuel supplied to the fuel injection hole 31 is dispersed into the fuel channel 21 of the anode separators 210 through any one of the fuel manifolds 41 in fluid communication with the fuel injection hole 31. Fuel is simultaneously supplied to the anodes 12 of the membrane-electrode assemblies 10. The oxidant supplied to the oxidant injection hole 32 is dispersed into the oxidant channel 22 of the cathode separators 220 through any one of oxidant manifolds 42 in fluid communication with the oxidant injection hole 32. Oxidant is simultaneously supplied to the cathodes 13 of the membrane-electrode assemblies 10. Electrical energy may be generated by the electrochemical reaction of the fuel and the oxidant in the membrane-electrode assemblies 10.

The unreacted fuel not used in the electrochemical reaction of the membrane-electrode assemblies 10 is discharged to the outside of the fuel cell stack 100 through the fuel outlet 33 via the opposing fuel manifold 41. The unreacted oxidant not used in the electrochemical reaction of the membrane-electrode assemblies 10 together with moisture generated as by-products of the electrochemical reaction are discharged to the outside of the fuel cell stack 100 through the oxidant outlet 34 via the opposing oxidant manifold 42.

Figure 4:
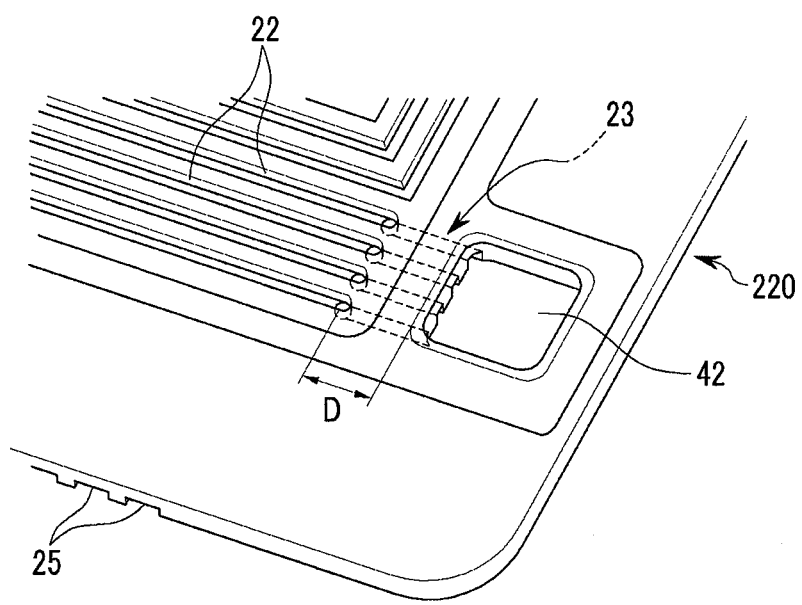
FIG. 4 is a partial enlarged view of the cathode separator of FIG. 2.
Figure 5:
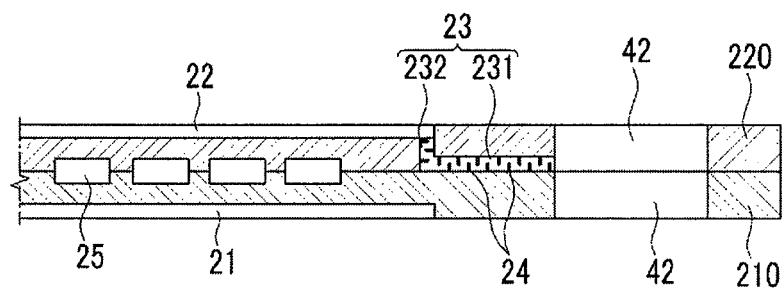
FIG. 5 is a first enlarged cross-sectional view of the first connection channel in the cathode separator shown in FIG. 4
Figure 6:
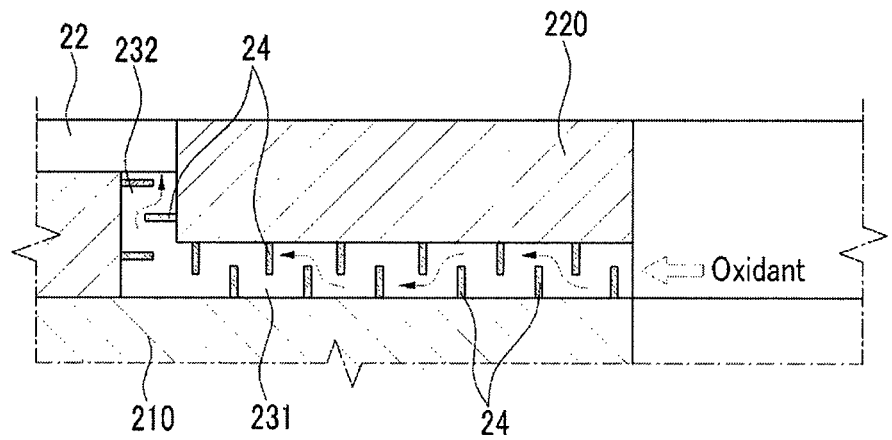
FIG. 6 is a second enlarged cross-sectional view of the first connection channel in the cathode separator shown in FIG. 4.

FIG. 4 is a partial enlarged view of the cathode separator shown in FIG. 2. FIGS. 5 and 6 are enlarged cross-sectional view of the first connection channel of the cathode separator shown in FIG. 4. FIGS. 4 and 5 illustrate an oxidant manifold (an oxidant inlet manifold) 42 configured to receive the oxidant. FIG. 5 illustrates an oxidant manifold 42 showing direction of oxidant flow in proximity to the anode separator 210.

Referring to FIGS. 4 to 6, the oxidant manifold 42 is formed to penetrate the cathode separator 220. The oxidant channel 22 is formed separated from the oxidant manifold 42 by a predetermined distance D (referring to FIG. 4) on the outside surface of the cathode separator 220. The oxidant channel 22 is a groove formed with a predetermined width and depth on the outside surface of the cathode separator 220. In some embodiments, the oxidant channel 22 may be formed with a zigzag or other pattern from a position in proximity to the oxidant inlet manifold 42 to a position in proximity to the oxidant outlet manifold 42.

The oxidant channel 22 is formed in fluid communication with the oxidant manifold 42 through the first connection channel 23 on the inside surface of the cathode separator 220. The first connection channel 23 includes a horizontal flow path 231 (e.g., first flow path) formed with a predetermined width and depth in the inner surface of the cathode separator 220 from the oxidant manifold 42 toward the oxidant channel 22. The first connection channel 23 also includes a vertical flow path 232 (e.g., second flow path) formed extending from the end portion of the horizontal flow path 231 in a thickness direction of the cathode separator 220 and in fluid communication with the oxidant channel 22.

The end portion of the horizontal flow path 231 overlaps the oxidant channel 22 such that the vertical flow path 232 is in fluid communication with the end portion of the horizontal flow path 231 and the end portion of the oxidant channel 22. The inner surface of the cathode separator 220 is positioned in proximity to the inner flat surface of the anode separator 210 in proximity to the first connection channel 23 both such that the oxidant does not leak and the oxidant manifold 42 and that the oxidant channel 22 is in fluid communication with the first connection channel 23.

Such that the oxidant may be uniformly distributed during operation, a plurality of first connection channels 23 and a plurality of oxidant channels 22 may be formed in proximity to a single oxidant manifold 42. That is, the horizontal flow path 231 and the oxidant channel 22 may include a plurality of grooves positioned with a predetermined distance interposed therebetween, and the vertical flow path 232 is provided with the same number as the number of horizontal flow paths 231 and oxidant channels 22. FIG. 4 illustrates the oxidant channel 22 and the horizontal flow path 231 as including four grooves; however the number of oxidant channels 22 and horizontal flow paths 231 is not limited thereto.

The first connection channel 23 of the above-described configuration is formed between the oxidant manifold 42 and the oxidant channel 22 at the side where the oxidant is exhausted. This configuration fluidly connects the oxidant manifold 42 and the oxidant channel 22. Also, a connection channel (a second connection channel) of the above-described configuration may be formed between two fuel manifolds 41 and the fuel channel 21 in the anode separator 210, thereby fluidly connecting the fuel manifolds 41 and the fuel channel 21. The fuel channel 21 may have the same shape as the above-described oxidant channel 22 except for the position of the end portion connected to the second connection channel.

In the fuel cell stack 100, the cathode separator 220 and the anode separator 210 may include a plurality of the first buffer protrusions 24. The first buffer protrusions 24 are configured to disperse the flow of the oxidant such that the pressure of the oxidant provided into the oxidant channel 22 is decreased. The first buffer protrusions 24 may be formed within the first connection channel 23 and be formed protruding within the first connection channel 23 such that oxidant passing through the first connection channel 23 would be dispersed. In some embodiments, the first buffer protrusions 24 are formed in a direction normal to the inside surface of the first connection channel. In some embodiments, one or more of the buffer protrusions 24 are formed at an angle from an inside surface of the first connection channel approximately 0°, 5°, 10°, 15°, 20°, 25°, 30°, 35°, 40°, 45°, 50°, 55°, 60°, 65°, 70°, 75°, 80°, 85°, and 90° or any number in between.

For example, as illustrated in FIG. 6, the cathode separator 220 includes a plurality of the first buffer protrusions 24 on the inner surface toward the horizontal flow path 231 and the vertical flow path 232. The anode separator 210 also includes a plurality of the first buffer protrusions 24 on the inner surface toward the horizontal flow path 231. The first buffer protrusions 24 as minute protrusions having a predetermined width and height are positioned with a predetermined distance therebetween along the length direction of the horizontal flow path 231 and the vertical flow path 232.

The first buffer protrusions 24 may be randomly positioned, or may be positioned in a predetermined manner such that they are configured to disperse the flow of the oxidant in a predetermined direction. For example, as illustrated in FIG. 6, the first buffer protrusions 24 may be alternately positioned on one side of the horizontal flow path 231 and the vertical flow path 232 and the other side of the horizontal flow path 231 and the vertical flow path 232 along the length direction of the horizontal flow path 231 and the vertical flow path 232.

Thus, in operation, the oxidant provided from the oxidant manifold 42 to the first connection channel 23 sequentially collides with the first buffer protrusions 24 formed on one side and the other side of the horizontal flow path 231 and the vertical flow path 232 such that the flow path of oxidant is altered. Thus, the flow of the oxidant passing through the first connection channel 23 may be dispersed in a zigzag pattern such that a pressure of the oxidant provided to the oxidant channel 22 is decreased. Accordingly, a stress concentration of the oxidant pressure may be smooth in the region (hereinafter, for convenience referred to as "an oxidant injected region") where the oxidant first enters the cathode 13.

As illustrated in FIG. 6, the first buffer protrusions 24 are alternately positioned at the inner surface of the cathode separator 220 and the anode separator 210 on the horizontal flow path 231, and in the left side and the right side of the vertical flow path 232 on the vertical flow path 232. In this case, the flow of the oxidant injected from the oxidant manifold 42 to the first connection channel 23 is dispersed in the zigzag method along the up and down direction with reference to the drawing. In FIG. 6, the flow direction of the oxidant passing through the first connection channel 23 is indicated by an arrow.

As described above, a plurality of the first buffer protrusions 24 are formed in the first connection channel 23 to disperse the flow of the oxidant such that the stress concentration generated in the oxidant injection region of the cathode 13 may be eased. This reduction in stress concentration may prevent untimely deterioration of the membrane-electrode assembly 10. Also, the more uniform distribution of oxidant in the oxidant channel 22 may improve contact efficiency of the cathode 13, and thereby improve efficiency of the membrane-electrode assembly 10.

Further, a plurality of the first buffer protrusions 24 are not formed in the inlet region of the oxidant channel 22, but instead are formed in the first connection channel 23 such that it is not necessary to provide a space for the installation of the first buffer protrusion 24 on a region (an effective region) of the cathode separator 220 facing the cathode 13 of the membrane-electrode assembly 10. Accordingly, the fuel cell stack 100 of the first exemplary embodiment may be configured to ensure the effective region of the membrane-electrode assembly 10 does not deteriorate in efficiency.

In addition, a cooling channel 25 may be formed at the inner surfaces of the anode separator 210 and the cathode separator 220. The cooling channel 25 is in fluid communication with a blower (not shown). In operation, the blower may cause external air to flow into the cooling channel 43. Thus, the temperature of the fuel cell stack 100 can be lowered due to the heat exchange of the external air and the fuel cell stack 100.

Figure 7:
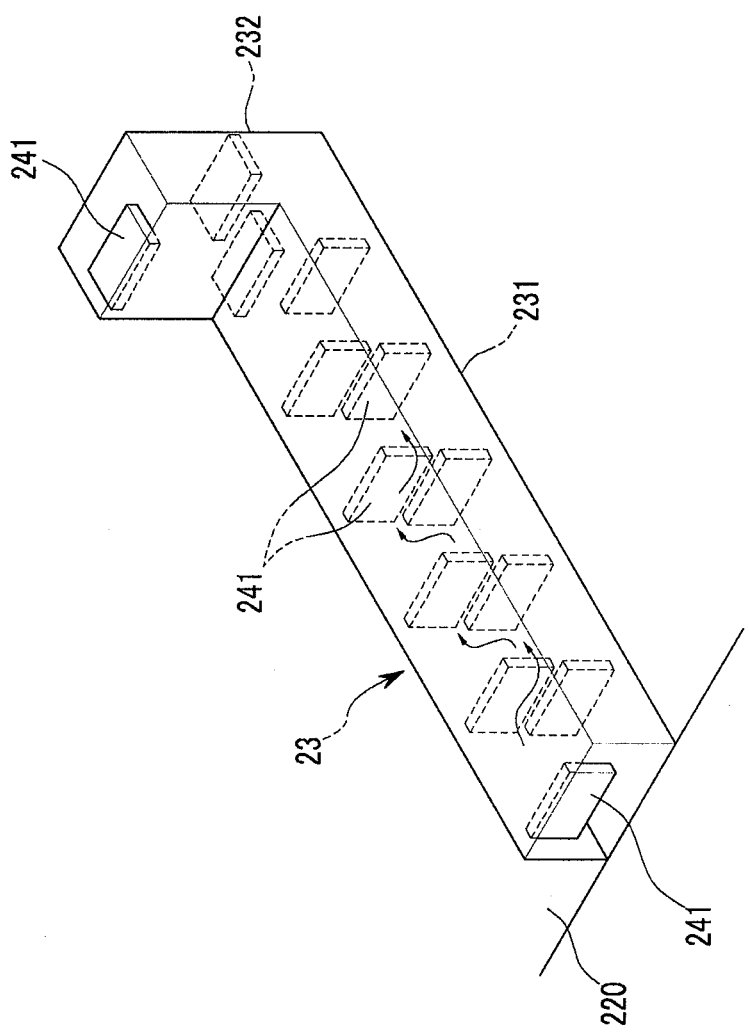
FIG. 7 is a perspective view of the first connection channel of the cathode separator in the fuel cell stack according to a second exemplary embodiment.

FIG. 7 is a perspective view showing the first connection channel of the cathode separator in the fuel cell stack according to a second exemplary embodiment. Referring to FIG. 7, a fuel cell stack may be similarly configured as the fuel cell stack according to the above-described first exemplary embodiment, except for the point where a first buffer protrusion 241 is formed on the inner surface of the cathode separator 220. Like reference numerals designate like elements of the first exemplary embodiment. That is, in the second exemplary embodiment, the first buffer protrusions 241 are alternately positioned on the inner surface of the cathode separator 220 corresponding to the left side of the horizontal flow path 231 and on the inner surface of the cathode separator 220 corresponding to the right side of the horizontal flow path 231 with reference to the drawing. In this case, the flow of the oxidant provided from the oxidant manifold 42 to the first connection channel 23 is dispersed in a zigzag type according to the left and right directions with reference to FIG. 7. In FIG. 7, the flow direction passing through the first connection channel 23 is indicated by the arrows.

In the second exemplary embodiment, the first buffer protrusions 241 are formed on the cathode separator 220. Accordingly, the fuel cell stack according to the second exemplary embodiment realizes the reducing effect of the pressure of the oxidant due to the first buffer protrusion 241, like the first exemplary embodiment. The manufacturing process of the first buffer protrusion 241 on the anode separator 210 may be omitted. Thus, the manufacturing process of the anode separator 210 may be simplified compared with the first exemplary embodiment.

On the other hand, first buffer protrusions 24 and 241 illustrated in FIGS. 4-7 may be arranged such that the oxidant flow is dispersed in the zigzag type. Alternatively, the first buffer protrusions 24 and 241 may be randomly arranged. In this case, during operation the oxidant collides with the first buffer protrusions and then is dispersed in several directions such that a similar result may be achieved in either the fuel cell stack according to the first exemplary embodiment and the second exemplary embodiment. Also, a plurality of the first buffer protrusions 24 and 241 may be formed in the first connection channel 23. That is, the first buffer protrusions 24 and 241 may only be formed in one of or only a portion of the horizontal flow path 231 and the vertical flow path 232 in the first connection channel 23. In the alternative, the first buffer protrusions 24 and 241 may be formed in both the horizontal flow path 231 and in the vertical flow path 232. The position and the number of first buffer protrusions 24 and 241 may be determined according to the pressure and the flow amount of the oxidant provided to the first connection channel 23.

Also, the first buffer protrusions 24 and 241 are formed in the first connection channel 23 of the cathode separator 220 provided with the oxidant, however an additional buffer protrusion (a second buffer protrusion) may be formed in the second connection channel of the anode separator 210 provided with the fuel.

Figure 8:
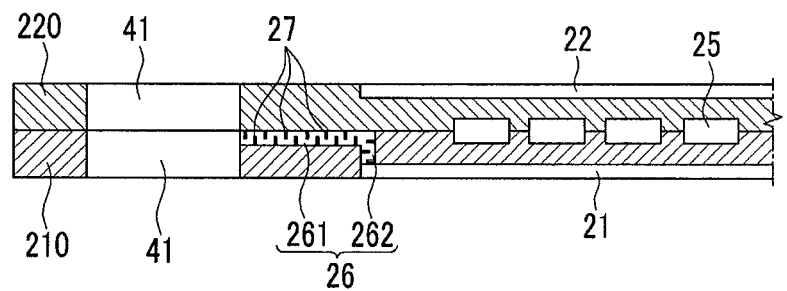
FIG. 8 is a partial cross-sectional view of a cathode separator and an anode separator in a fuel cell stack according to a third exemplary embodiment.

FIG. 8 is a partial cross-sectional view of a cathode separator and an anode separator in a fuel cell stack according to the third exemplary embodiment. Referring to FIG. 8, a fuel manifold 41, a fuel channel 21 formed on the outer surface, and a second connection channel 26 fluidly connecting the fuel manifold 41 and the fuel channel 21 are formed in the anode separator 210. The second connection channel 26 includes a horizontal flow path 261 (e.g., third flow path) formed with the predetermined width and depth in the inner surface of the anode separator 210, and a vertical flow path 262 (e.g., fourth flow path) formed extending from the end portion of the horizontal flow path 261 along the thickness direction of the anode separator 210 and fluidly connected to the fuel channel 21.

In the fuel cell stack of the third exemplary embodiment, the anode separator 210 and the cathode separator 220 include a second buffer protrusion 27 formed in the second connection channel 26. The second buffer protrusion 27 is positioned and configured to disperse the pressure of fuel flow into the fuel channel 21. In operation, the fuel flows into the second connection channel 26 from the fuel manifold 41 and then exits the second connection channel 26 into the fuel channel 21. The presence of the second buffer protrusion 27 functions to decrease fuel pressure of the fuel entering the fuel channel. This decrease in fuel pressure may function to increase fuel dispersion uniformity and improve contact efficiency of the anode 12. Such increase and improvement may preserve the lifetime of the anode 12 and increase electricity generating efficiency of the membrane-electrode assembly 10.

The second buffer protrusion 27 may be positioned similar to the first buffer protrusion 24 depicted in FIG. 6. The second buffer protrusion 27 may be positioned in the same formation as the first buffer protrusion 241 depicted in FIG. 7. The second buffer protrusion 27 may also be randomly positioned. In the first case, a portion of the second buffer protrusions 27 are formed in the inner surface of the cathode separator 220 in the second connection channel 26. In the second case, the second buffer protrusions 27 are not formed in the inner surface of the cathode separator 220.

Also, the second buffer protrusions 27 may be formed in only one of or only a portion of the horizontal flow path 261 and the vertical flow path 262. The second buffer protrusions 27 may be formed in both of the horizontal flow path 261 or the vertical flow path 262. In each the above-described configurations, during operation of the device the fuel collides with the second buffer protrusions 27 such that the flow thereof is dispersed in several directions. This dispersion decreases fluid pressure and creates more smooth fluid flow.

While this invention has been described in connection with what are presently considered to be practical certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A fuel cell stack, comprising:
   a plurality of membrane-electrode assemblies, wherein each of the plurality of membrane-electrode assemblies comprises an electrolyte membrane, an anode formed on a first surface of the electrolyte membrane, and a cathode formed on a second surface of the electrolyte membrane; and
   a plurality of separators positioned between the membrane-electrode assemblies, each of the plurality of separators including an anode separator facing the anode and a cathode separator facing the cathode, at least two manifolds, a channel separated from the manifolds and facing at least one of the anode and the cathode, a connection channel in fluid communication with one of the at least two manifolds and the channel, and a buffer protrusion system formed within the connection channel and configured to disperse the flow of the fuel or the oxidant,
   the one of the at least two manifolds including an oxidant manifold, the channel including an oxidant channel, and the cathode separator including the oxidant manifold and the oxidant channel, the connection channel including a first flow path formed on an inner surface of the cathode separator from the oxidant manifold toward the oxidant channel and a second flow path in fluid communication with both an end portion of the first flow path and the oxidant channel in a thickness direction of the cathode separator, and the buffer protrusion system including a plurality of buffer protrusions alternately formed on opposite sides of the first flow path and the second flow path.

2. The fuel cell stack of claim 1, wherein the cathode separator is positioned in proximity to the anode separator such that an inner surface of the anode separator covers the connection channel.

3. The fuel cell stack of claim 1, wherein the anode separator includes a fuel buffer protrusion system formed within a fuel connection channel.

4. The fuel cell stack of claim 3, wherein the fuel buffer protrusion system comprises a plurality of fuel buffer protrusions alternately formed within the fuel connection channel.

5. A fuel cell stack, comprising:
   a plurality of membrane-electrode assemblies, wherein each of the plurality of membrane-electrode assemblies comprises an electrolyte membrane, an anode formed on a first surface of the electrolyte membrane, and a cathode formed on a second surface of the electrolyte membrane; and
   a plurality of separators positioned between the membrane-electrode assemblies, each of the plurality of separators including:
   an anode separator facing the anode and a cathode separator facing the cathode, at least two manifolds, a channel separated from the manifolds and facing at least one of the anode and the cathode, a connection channel in fluid communication with one of the at least two manifolds and the channel, and a buffer protrusion system formed within the connection channel and configured to disperse the flow of the fuel or the oxidant, the one of the at least two manifolds including a fuel manifold, the channel including an fuel channel, and the anode separator including the fuel manifold and the fuel channel, the connection channel including a third flow path formed on an inner surface of the anode separator from the fuel manifold toward the fuel channel and a fourth flow path in fluid communication with both an end portion of the third flow path and the fuel channel in a thickness direction of the anode separator, and the buffer protrusion system including a plurality of buffer protrusions alternately formed on opposite sides of the third flow path and the fourth flow path.

6. The fuel cell stack of claim 5, wherein the cathode separator is positioned in proximity to the anode separator such that an inner surface of the cathode separator covers the connection channel.

7. The fuel cell stack of claim 6, wherein the cathode separator comprises an oxidant buffer protrusion system within an oxidant connection channel.

8. The fuel cell stack of claim 7, wherein the oxidant buffer protrusion system comprises a plurality of oxidant buffer protrusions alternately formed within the oxidant connection channel.

9. A fuel cell stack, comprising:

a plurality of membrane-electrode assemblies, wherein each of the plurality of membrane-electrode assemblies comprises an electrolyte membrane, an anode formed on a first surface of the electrolyte membrane, and a cathode formed on a second surface of the electrolyte membrane; and a plurality of separators positioned between the membrane-electrode assemblies, each of the plurality of separators including an anode separator facing the anode and a cathode separator facing the cathode, wherein the cathode separator comprises an oxidant manifold, an oxidant channel separated from the oxidant manifold and facing the cathode, and a first connection channel in fluid communication with the oxidant manifold and the oxidant channel, and a first buffer protrusion system formed in the first connection channel, wherein the anode separator comprises a fuel manifold, a fuel channel separated from the fuel manifold and facing the anode, and a second connection channel fluidly connecting the fuel manifold and the fuel channel are formed in the anode separator; and a second buffer protrusion system formed in the second connection channel, and wherein the first buffer protrusion system is formed in the first connection channel having a first flow path formed on an inner surface of the cathode separator from the oxidant manifold toward the oxidant channel and a second flow path in fluid communication with both an end portion of the first flow path and the oxidant channel includes a plurality of oxidant buffer protrusions alternately formed on opposite sides of the first flow path and the second flow path, or the second buffer protrusion system is formed in the second connection channel having a third flow path formed on an inner surface of the anode separator from the fuel manifold toward the fuel channel and a fourth flow path in fluid communication with both an end portion of the third flow path and the fuel channel includes a plurality of fuel buffer protrusions alternately formed on opposite sides of the third flow path and the fourth flow path.

* * * * *